Dec. 15, 1959     A. T. FENNELL     2,917,321
CAR JACKING DEVICE
Filed Oct. 8, 1957     2 Sheets-Sheet 1
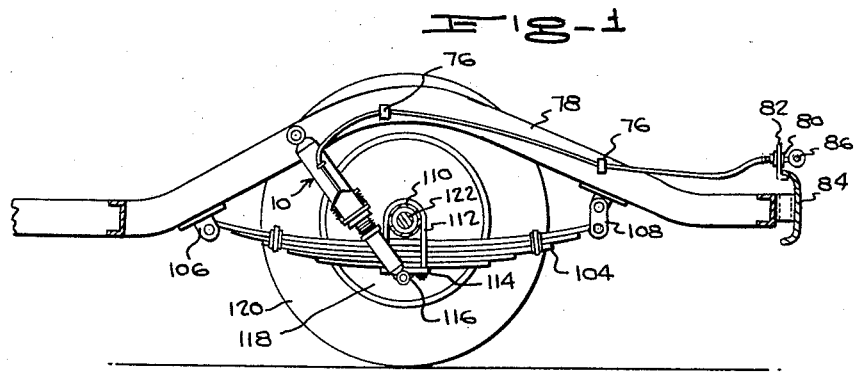
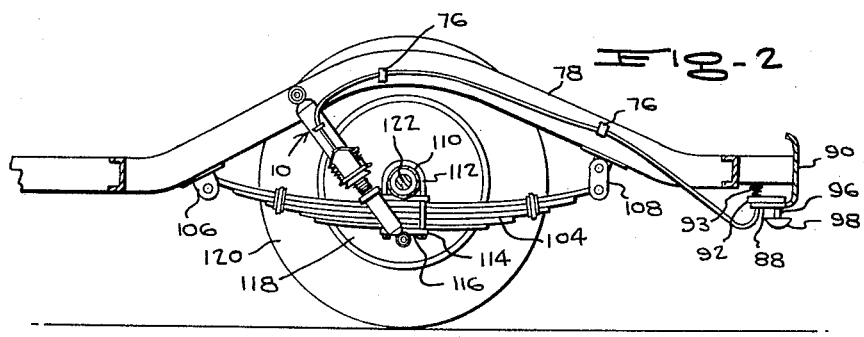
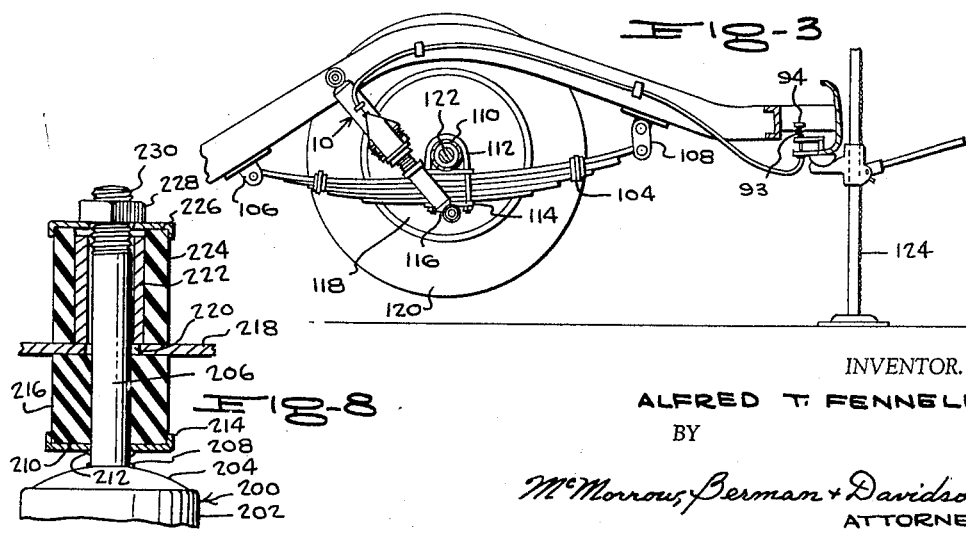
INVENTOR.
ALFRED T. FENNELL
BY
McMorrow, Berman & Davidson
ATTORNEYS

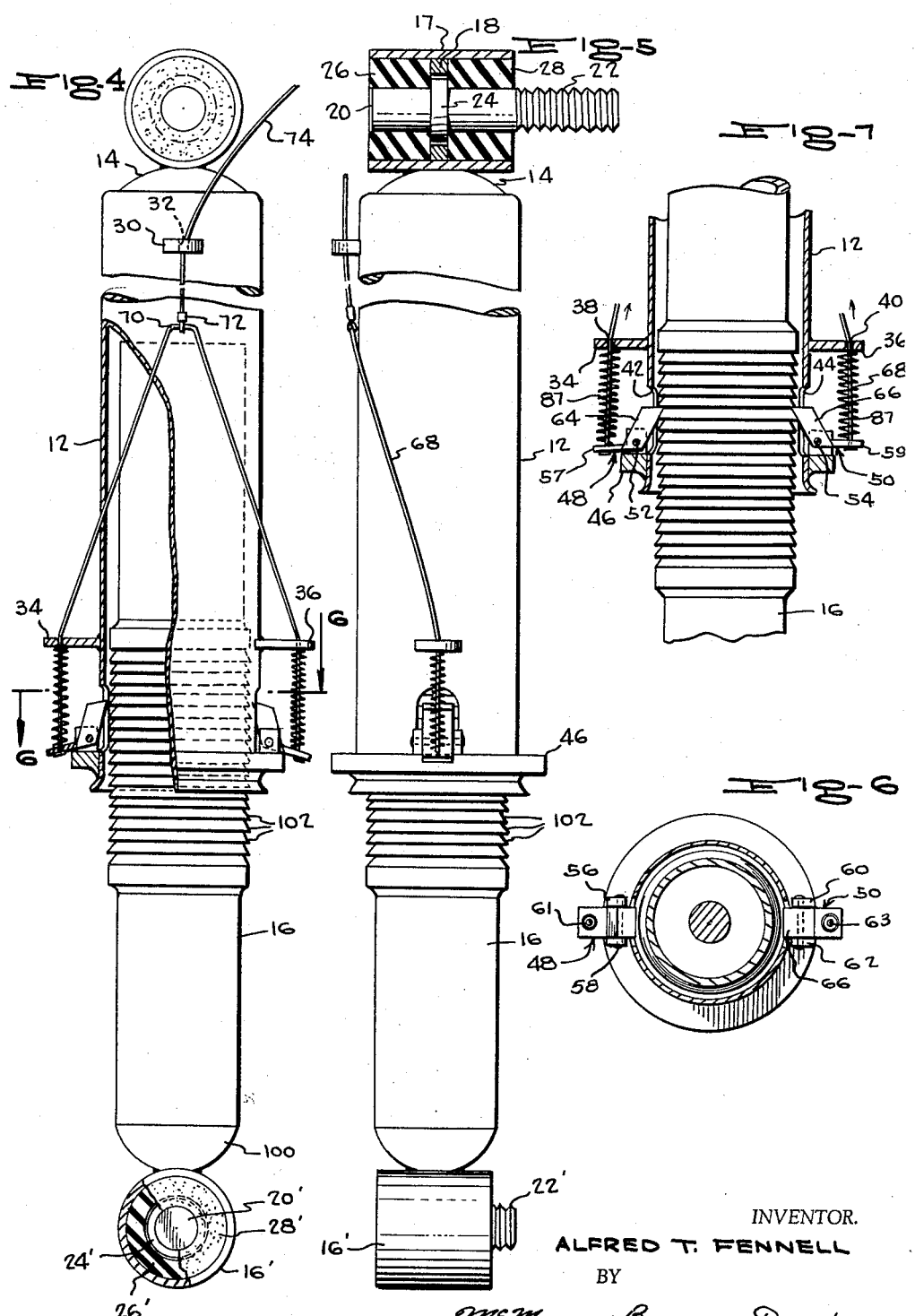

United States Patent Office 2,917,321
Patented Dec. 15, 1959

2,917,321

CAR JACKING DEVICE

Alfred Thomas Fennell, Cleveland, Ohio

Application October 8, 1957, Serial No. 688,868

10 Claims. (Cl. 280—150)

This invention relates to a jacking device for automobiles or other road vehicles and, more specifically, the present invention pertains to the provision of means for facilitating the removal of an automobile wheel or tire, especially in such cases as wherein the tire is deflated.

As a consequence of modern day automobile construction the wheel axles are, for all practical purposes, inaccessible for the placement of a jack thereunder to elevate a vehicle wheel in the event of tire deflation. The manufacturers of current automobiles have had to, as a result of such construction, resort to the provision of bumper jacks or jacks for engaging some other accessible portion of the vehicle frame. However, all of the heretofore known means for jacking a wheel of a modern day automobile are subject to many disadvantages, among which are the loss of time and the expenditure of excessive energy by the operator in effecting the elevation of a given wheel. These conditions obtain since the vehicle chassis and body are spring sprung and it is thus necessary that the chassis and body be first raised to the limit of flexibility of the spring means and thereafter elevating the spring means through the tensional strength thereof.

The present invention has, as one of its primary objects, the provision of jacking means for automobiles which completely obviates all of the above noted and other well known disadvantages attendant in current wheel jacking practice.

Another object of this invention is to provide a simply constructed shock absorber for automobiles with means for locking the shock absorber to prevent relative movement between the chassis of the vehicle and the suspension means therefor, whereby a jack suitably placed for engagement with the chassis or other accessible parts of the vehicle will elevate a wheel adjacent the locked shock absorber substantially simultaneously with the elevation of the suspension means, a chassis and vehicle body.

A further object of this invention is to provide a shock absorber of the type described generally above, wherein the locking action may be achieved through manually or automatically operable means.

A still further object of this invention is to provide a resilient type lost motion connection between the above-mentioned shock absorber and its connections with the vehicle chassis and its suspension means.

This invention contemplates, as a still further object thereof, the provision of a shock absorber of the type described supra, the shock absorber being non-complex in construction and assembly, inexpensive to manufacture, and durable in use.

Other and further objects and advantages of the present invention will become more evident from a consideration of the following specification when read in conjunction with the annexed drawings, in which:

Figure 1 is a side elevational view illustrating a shock absorber constructed in accordance with the teachings of this invention connected between an automobile chassis and the suspension means therefor, together with manually operable means for locking the reciprocating portions of the absorber to prevent relative movement therebetween;

Figure 2 is a side elevational view of a shock absorber constructed in accordance with this invention, together with automatically operable means for locking the reciprocating parts of the absorber to prevent relative movement therebetween;

Figure 3 is a side elevational view of a shock absorber, constructed in accordance with the teachings of this invention, the reciprocating component elements thereof having been locked automatically by the application of a bumper jack to the vehicle bumper whereby a given vehicle wheel may be elevated or disengaged from the ground together with the vehicle chassis and the suspension means therefor;

Figure 4 is a side elevational view partly in cross-section, and partially broken away to clearly illustrate the construction and assembly of the shock absorber per se;

Figure 5 is a side elevational view of the shock absorber rotated substantially 90° from its position illustrated in Figure 4;

Figure 6 is a transverse, cross-sectional view taken substantially on the horizontal plane of line 6—6 of Figure 4, looking in the direction of the arrows;

Figure 7 is a fragmentary, detailed, cross-sectional view of the shock absorber, illustrating the component parts thereof locked against relative reciprocal movement; and Figure 8 is an enlarged, fragmentary, detailed, cross-sectional view, illustrating a modification of a resilient type lost motion connection between the shock absorber and its connections with the vehicle chassis and its suspension means.

Referring now more specifically to the drawings, reference numeral 10 designates, in general, a shock absorber constructed in accordance with the present invention. The shock absorber 10 is of the substantially standard type and includes a substantially rigid cylinder 12 having a concave-convex end wall 14 extending across the other end thereof, and a reciprocating plunger 16 extending through the other open end of the cylinder 12.

A substantially hollow cylindrical housing 17 having a pair of opposed open ends rigidly secured to the convex outer side of the end wall 14, with the axes of the cylinder and cylindrical housing 17 disposed at substantially right angles relative to each other. Disposed within the housing 17, substantially centrally thereof, is a metallic annular member 18, the member 18 being coaxially positioned with respect to the housing 17. An elongated bolt 20 having a threaded end 22 has a radial flange 24 intermediate its ends extends coaxially into the housing 17 and the annular member 18 with the radial flange 24 located in spaced juxtaposed position relative to the annular member 18.

A pair of resilient tubular elements 26, 28 are telescoped over the bolt 20 and within the housing 17. As is seen in Figure 5, the adjacent inner ends of the tubular elements 26, 28 abut against the opposite sides of the annular member 18 and flange 24.

Adjacent the upper end of the cylinder 12 is secured a lobe 30 having an axially extending transverse bore 32. A pair of diametrically opposed flanges 34, 36 have one of their respective ends rigidly connected to the cylinder 12 adjacent the lower open end thereof and are provided with axially extending transverse apertures 38, 40, respectively (see Figure 7). The flanges 34, 36 are radially spaced substantially 90° away from the lobe 30 on opposite sides thereof.

A pair of vertically elongated substantially rectangular diametrically opposed slots 42, 44 are formed in the cylinder 12 below the flanges 34, 36, respectively, and immediately below the lower ends of the slots is a circumferential external flange 46 rigidly secured to the cylinder 12 by conventional means. A pair of bell crank levers 48, 50 are pivotally mounted on pivot pins 52, 54, the ends of which are supported between pairs of spaced lugs 56, 58 and 60, 62, respectively, the lugs being fixedly secured to the ring 46. The levers 48, 50 are diametrically opposed and one end thereof, 57, 59 projects laterally away from the ring 46 and each is apertured at 61, 63 respectively. The other ends 64, 66 of the levers 48, 50 are adapted for pivotal movement into and out of the cylinder 12 through the slots 42, 44.

A length of preferably shielded cable 68 is threaded through the openings 36, 60 and 48, 62, respectively, and extends around the cylinder 12 upwardly towards the lobe 30. The bight portion 70 of the cable 68 is connected through a conventional connector 72 to one end of a second shielded cable 74 which extends through the bore 32 of the lobe 30. The other end of the cable 74 is secured by brackets 76 to a side frame member 78 and extends through a grommet 80 carried on a plate 82 fixedly secured to a bumper 84, in the manner illustrated in Figure 1. The said other end of the cable 74 is fixedly connected to a manually operated ring handle 86. Helicoidal springs 87 surround the ends of the cable 68 which extend between the flanges 38, 40 and the ends 56, 58, respectively, of the levers 48, 50.

In the embodiment of the invention illustrated in Figures 2 and 3 said other end of cable 74 projects through a plate 88 rigidly secured to a second bumper 90. The said other end of the cable 74 also extends through a second plate 92 and is fixedly secured to a disc 94. The plate 92 is superposed on the plate 88 and a helicoidal spring surrounds the cable 74 and is interposed between the plate 92 and the disc 94. The plate 92 is provided with a downwardly descending shaft 96 which extends through the plate 88 and terminates in a button 98.

As is seen in Figures 1, 2 and 3, the cylinder 12 is fixedly secured to the side frame member 78 by the bolt 20.

As has been set forth above, the plunger 16 is adapted for reciprocation within the cylinder 12.

Referring now more particularly to Figures 4 and 5 of the drawings, it is seen that the lower end of the plunger 16 terminates in a convex end portion 100. To the end 100 is secured an assembly identical to that connected to the end wall 14, and, consequently, elements of the former having counterparts in the latter, are provided with identical reference numerals to which a prime mark has been added for identification purposes. While it has been stated that the assemblies are identical, there is a minor exception which resides in the fact that the bolt 20 is longer than the bolt 20'.

The plunger 16, intermediate the ends thereof, is provided with a plurality of longitudinally spaced, substantially circumferentially extending rack teeth 102. The side frame member 78 is sprung from a half-elliptical type leaf spring 104 the ends of which are connected thereto through conventional connectors 106, 108. The spring 104 is clamped to an axle housing 110 by conventional inverted substantially U-shaped clamping bolts 112 and clamp plate 114. The plate 114 carries an internally threaded boss 116 which receives the threaded end 22' of the bolt 20'.

Wheels 118 having tires 120 are mounted on the opposed ends of the wheel axle 122 in the conventional manner.

The principle of operation of the embodiment of this invention disclosed in Figures 1 and 2 is identical. For example, and referring to Figure 1, let it be assumed that it is desired to remove the wheel 118 and tire 120 for replacement or repair. The operator places a bumper jack (such as the jack 124 shown in Figure 3) in position below the bumper 84 and effects engagement therebetween. Thereafter, the handle 86 is pulled outwardly away from the bumper 84 to effect movement of the cable 74 and the cable 68 in the direction of the arrows shown in Figure 7. This movement is, in turn, transmitted to the ends 56, 58 of the levers 48, 50 to cause the lever 48 to pivot in a clockwise direction about the pivot pin 52, whereby the end 64 of the lever 48 engages one of the rack teeth 102. The aforesaid movement of the cable 68 causes the lever 50 to pivot in a counter-clockwise direction so that the end 66 of the lever 50 engages the same one of the rack teeth 102. The operator continues the actuation of the jack 124 until the wheel 118 and tire 120 have been elevated a desired distance above the ground.

It should be noted at this point that the suspension means 104 and the side frame member 78 are locked against relative movement therebetween. It should also be understood that as the levers 48, 50 pivot in the described directions, the springs 87 become compressed, but the tension thereof is insufficient to overcome the weight of the vehicle on the shock absorber 10, thus the levers 48, 50 will not be disengaged from the rack piece 102.

After the wheel 118 and tire 120 have been replaced upon the axle 122, the operator then actuates the jack 124 in such a manner as to permit the tire 120 to reengage the ground. The weight of the vehicle is then gradually transferred to the suspension means 104 thereby substantially relieving the shock absorber 10 of any downward thrust thereon. At this time, the tension of the springs 87 exerts a sufficient force on the ends 56, 58 of the levers 48, 50 and causes the same to pivot in the opposite directions whereby the ends 64, 66 of the levers 48, 50 become disengaged from the rack tooth 102. The shock absorber is thus returned to its normal operating condition.

The operation of the embodiment of this invention illustrated in Figures 2 and 3 is the same as that described above in connection with the operation of the embodiment illustrated in Figure 1, with the exception that the cables 68, 74 are actuated by placing the bumper jack 124 below the knob 98 carried on the shaft 96 connected with the plate 92. As the jack 124 is elevated, the plate 92 moves upwardly and compresses the spring 93 (between the element 94 and plate 92 and at the same time causes the cable 68 to move upwardly relative to the absorber 10. This movement, as described above, causes the levers 48, 50 to move from their unlocked positions, illustrated in Figure 4, to their locked positions shown in Figure 7. With the wheel 118, its tire 120, the axle 122, suspension means 104 and a chassis member 78 locked against relative movement, the operator actuates the jack 124 until the tire 120 is disengaged from the ground. Thereafter, the wheel 118 and tire 120 may be removed for repair or replacement after which the operator actuates the jack 124 to permit the aforementioned elements to descend until the tire 120 reengages with the ground. The plate 92 is now urged to move downwardly under the tension of the compressed spring 93, and after the weight of the vehicle has been transferred from the shock absorber 10 to the suspension means 104, the helicoidal springs 87 again become operative to cause the levers 48, 50 to pivot in their respective other directions, thereby restoring the absorber 10 to its normal working condition.

Another novel feature of this invention resides in the assemblies connected to the top and bottom of the shock absorber 10. It will be noted in the Figure 5 that a small space is present between the flange 24 and the juxtaposed annular member 19. Under normal road conditions, the resilient members 26, 28 absorb any stress effected by relative movement between the bolt 20 and the cylinder 12. However, should the stress on the resilient members 26, 28 become sufficiently great, the annular member 19 will engage the flange 24 thereby preventing excessive stresses from being imparted to the resilient members 26, 28 and prevent the same from damage. The operation of the assembly connected to the bottom of the plunger 16 is identical.

Figure 8 illustrates another embodiment of this invention and is specifically directed to the assemblies connected to the ends of the cylinder and plunger members of the shock absorber.

In this embodiment of the invention, reference numeral 200 designates a shock absorber of the type described above, the shock absorber 200 having a cylindrical wall 202 and a concave convex end wall 204. One end of an elongated bolt 206 is welded at 208 to the convex side of the end wall 204 and projects longitudinally therefrom in coaxial alignment with the cylinder 202. A centrally apertured plate 210 is mounted on the bolt 206 and is welded thereto at 212 at a point adjacent the wall 204. The plate 210 is provided with an integrally formed upwardly projecting continuous circumferential flange 214. A vertically elongated centrally apertured cylindrical member 216 is mounted on the bolt 206 and seats on the plate 210 and the lower end thereof fits snugly within the circumferential flange 214.

Reference numeral 218 designates a vehicle frame member having an aperture 220 extending transversely therethrough. As is seen in Figure 8, the bolt 206 projects upwardly and loosely through the aperture 220, and the upper end of the bolt 206 receives thereover an elongated substantially hollow metallic cylindrical element 222. A second resilient member 224 having a substantially cylindrical configuration, is telescoped over the metallic member 222 and, as is seen in the figure, the axial length of the resilient member 224 is greater than the axial length of the metallic member 222. A centrally apertured cap 226 is mounted over the upper end of the bolt 206 and seats against the upper end of the resilient member 224. A nut 228 is threaded on the threaded end 230 of the bolt 206 and engages against the upper side of the cap 226 to maintain the above described elements in their respective positions.

With the cap 226 in place, it will be seen that there is a small gap or area which exists between the upper end of the metallic member 222 and the adjacent side of the cap 226.

The nature and function of this assembly is identical to the nature and function of the assembly heretofore described. It will be understood that the resilient members 216, 224 will absorb all normal stress placed thereon, but in the event of an extreme stress, the force thereof is transmitted from the resilient members to the metallic element 222 by engagement of the cap 226 to the upper end of the metallic element 222.

While the assembly illustrated in Figure 8 has been described in connection with the cylinder member of the shock absorber, it will be understood that the same assembly may be connected to the lower end of the piston which complements the absorber 200.

Having described and illustrated a plurality of embodiments of this invention, it will be understood that the same are offered merely by way of example, and that this invention is to be limited only by the scope of the appended claims.

What is claimed is:

1. A shock absorber comprising an elongated substantially hollow cylinder having opposed open and closed ends, a plunger mounted for reciprocation within said cylinder through said open end, said cylinder having a pair of axially extending elongated slots formed therein adjacent said open end in diametrically opposed relation relative to each other, a circumferential ring fixedly secured to said cylinder adjacent said open end thereof and positioned immediately below said slots, a lever for each of said slots, means pivotally connecting each of said levers to said ring, said plunger having a plurality of longitudinally spaced circumferential rack teeth formed thereon intermediate its ends, and remotely disposed selectively operable means for actuating said levers to pivot one of their respective ends through said slots for engagement with one of said rack teeth to prevent relative movement between said cylinder and said plunger in one direction.

2. A shock absorber comprising an elongated, substantially hollow cylindrical member having a pair of opposed open and closed ends, a plunger mounted for reciprocation within said cylinder through said open end, said plunger having a plurality of longitudinally spaced circumferential rack teeth formed thereon intermediate the ends thereof, said cylinder having a pair of diametrically opposed slots formed therein adjacent said open end thereof, a ring fixedly secured to said cylinder adjacent said open end thereof, said ring being disposed immediately below said slots, a lever for each of said slots, means pivotally connecting said levers on said ring, means for actuating each of said levers to effect pivotal movement of one end thereof through said slots for engagement with one of said rack teeth, and resilient means connected with each of said levers constantly biasing said levers for pivotal movement out of engagement with said one of said rack teeth.

3. A shock absorber comprising a substantially hollow cylinder having a pair of opposed open and closed ends, a plunger mounted for reciprocation within said cylinder through said open end thereof, said plunger having a plurality of longitudinally spaced circumferential rack teeth formed thereon, said cylinder having a pair of diametrically opposed axially extending slots formed therein adjacent said open end thereof, a ring fixedly secured to said cylinder immediately below said slots, a bell crank lever for each of said slots, means pivotally connecting said bell crank levers on said ring, means connected with one end of each of said levers for actuating the same to effect engagement of the other end of said bell crank levers with one of said rack teeth, and resilient means engaging said one end of each of said bell crank levers constantly biasing said levers for movement in their respective opposite directions to effect disengagement of said other ends thereof from said one of said rack teeth.

4. A shock absorber comprising an elongated substantially hollow cylindrical member having a pair of opposed open and closed ends, a plunger mounted for reciprocation within said cylindrical member through the open end thereof, said plunger having a plurality of axially extending circumferential rack teeth formed thereon intermediate the ends thereof, said cylindrical member having a pair of diametrically opposed axially extending slots formed therein, a ring fixedly secured to said cylindrical member adjacent the lower end thereof and immediately below the said slots, a bell crank lever for each of said slots, means pivotally connecting each of said levers on said ring, flexible actuating means connected with one end of each of said bell crank levers, said means being operable to effect pivotal movement of each of said levers to cause the other ends of each of said levers to engage one of said rack teeth and thereby prevent relative movement between said cylindrical member and said plunger in one direction, and resilient means connected with said one end of each of said bell crank levers, said resilient means constantly biasing said levers for pivotal movement in the other direction to effect disengagement of said other ends of said bell crank levers from said one of said rack teeth.

5. A shock absorber for road vehicles comprising an elongated substantially hollow cylindrical member having a pair of opposed open and closed ends, an elongated substantially cylindrical plunger mounted for reciprocation within said cylindrical member through said open end thereof, said plunger having a plurality of longitudinally spaced circumferential rack teeth formed thereon intermediate the ends thereof, said cylindrical member having a pair of diametrically opposed axially extending slots formed therein adjacent said open end, a ring fixedly secured to said cylindrical member adjacent said open end thereof and immediately below said slots, a bell crank lever for each of said slots, means pivotally connecting each of said bell crank levers on said ring, said cylindrical member having a lobe projecting laterally away therefrom adjacent the upper end thereof, said lobe having a bore extending transversely therethrough, a pair of diametrically opposed flanges having one of their respective ends fixedly secured to said cylindrical member adjacent said slots, each of said flanges having an aperture formed therein and extending transversely therethrough, a length of flexible cable threaded through each of said apertures and fixedly secured to one of the ends of each of said bell crank levers, a second cable having one of its ends extending through said bore and connected with the bight portion of said first cable, a helicoidal spring surrounding the opposed ends of said first cable and having one of their respective ends engaging against said one end of each of said bell crank levers, and the other ends of said helicoidal springs engaging against said diametrically opposed flanges, said second cable being operable to draw said first cable through said apertures formed in said flanges to effect pivotal movement of said bell crank levers whereby the other ends thereof are pivoted through said slots for engagement with one of said rack teeth to prevent relative movement between said cylindrical member and said plunger in one direction, and said helicoidal springs constantly biasing said levers for pivotal movement in their other direction out of engagement with said one of said rack teeth.

6. A shock absorber for a wheeled road vehicle having a frame and suspension means therefor, said shock absorber comprising an elongated substantially hollow cylindrical member having a pair of opposed open and closed ends, a plunger mounted for reciprocation within said cylindrical member through said open end thereof, said plunger having a plurality of axially spaced circumferential rack teeth formed thereon intermediate the ends thereof, said cylindrical member having a pair of diametrically opposed slots formed therein adjacent said open end, a ring fixedly secured to said cylindrical member adjacent said open end and immediately below said slots, a pair of bell crank levers pivotally mounted on said ring in confronting relation relative to said slots, a pair of apertured diametrically opposed flanges having one of their respective ends connected with said cylindrical member above said slots, a length of flexible cable extending through said apertured flanges and having its ends, respectively, connected with one of the ends of said bell crank levers, a second cable having one of its ends connected to the bight of said first cable, said second cable extending along said vehicle frame and having a manually operable handle fixedly secured to the other end thereof, said cables being operable to effect pivotal movement of said bell crank levers to extend the other ends thereof through said slots and into engagement with one of said rack teeth to prevent relative movement between said cylindrical member and said plunger in one direction, a helicoidal spring surrounding those portions of said first cable extending between said flanges and said one ends of said bell crank levers, said springs engaging said flanges and said one ends of said levers and constantly biasing said levers for pivotal movement out of engagement with said one of said rack teeth, and means for connecting the remote ends of said cylindrical member and said plunger with said frame and said suspension means, respectively.

7. A shock absorber as defined in claim 6, wherein said last named means comprises a pair of substantially hollow cylindrical housings having a pair of opposed open ends, said housings being fixedly secured, respectively, to the remote ends of said cylindrical member and said plunger, said housings having their respective longitudinally extending axes disposed at right angles with respect to the longitudinal axes of said cylindrical member and said plunger, an annular member disposed within each of said housings in coaxial alignment relative thereto, a flanged bolt extending coaxially through each of said housings with said flanges disposed in spaced confronting relation, relative to said annular members, said bolts being adapted for connection with, respectively, said frame and said suspension means, and a pair of resilient members telescoped over the opposed ends of each of said bolts within each of said housings, said pairs of resilient members having their respective adjacent ends abutting said flange of their respective associated bolts.

8. A shock absorber as defined in claim 6, wherein said last named means comprises an elongated bolt connected with the remotely disposed ends of said cylindrical member and said plunger in coaxial alignment therewith, said bolts extending loosely through said frame and said suspension means, a circular plate fixedly secured to each of said bolts adjacent said remote ends of said cylindrical member and said plunger, a resilient member telescoped over each of said bolts and interposed between said frame and one of said plates and said suspension means and the other of said plates, an elongated hollow rigid cylindrical member loosely mounted over said bolts with one end thereof engaging said frame and said suspension means, a substantially hollow cylindrical resilient member telescoped over each of said rigid cylindrical members, said last named resilient members having their longitudinal axes greater than the axes of said rigid cylindrical members, and a cap mounted over each of said bolts and engaging the remote ends of said last named resilient members.

9. A shock absorber for a wheeled road vehicle having a frame, a bumper connected with said frame, and suspension means for said frame, said shock absorber comprising an elongated substantially hollow cylindrical member having a pair of opposed open and closed ends, a plunger mounted for reciprocation within said cylindrical member through said open end thereof, said plunger having a plurality of axially spaced circumferential rack teeth formed thereon intermediate the ends thereof, said cylindrical member having a pair of diametrically opposed slots formed therein adjacent said open end, a ring fixedly secured to said cylindrical member adjacent said open end and immediately below said slots, a pair of bell crank levers pivotally mounted on said frame in confronting relation relative to said slots, a pair of apertured diametrically opposed flanges having one of their respective ends connected with said cylindrical member above said slots, a length of flexible cable extending through said apertured flanges and having its ends, respectively, connected with one of the ends of said bell crank levers, a second cable having one of its ends connected to the bight of said first cable, said second cable extending along said vehicle frame, a first plate connected with said bumper, a second plate mounted on said first plate, a shaft having one end thereof connected with said second plate and extending through said first plate, a button fixedly connected to the other end of said shaft for engagement with a bumper jack, the other end of said second cable being connected with said second plate, said cables being operable to effect pivotal movement of said levers to extend the other ends of said levers through said slots and into engagement with one of said rack teeth to prevent relative movement between said cylindrical member and said plunger in one direction, a helicoidal spring surrounding those portions of said first cable extending between said flanges and said one ends of said bell crank levers, said springs engaging said flanges and said one ends of said levers and constantly biasing said levers for pivotal movement out of engagement with said one of said rack teeth, and means for connecting the remote ends of said cylindrical member and said plunger with said frame and said suspension means, respectively.

10. A shock absorber comprising an elongated substantially hollow member, a plunger mounted for reciprocation within said hollow member, said plunger having ratchet means formed thereon intermediate the ends thereof and surrounded by said hollow member, said hollow member having slots formed therein, a ring fixedly secured to said hollow member, said ring being disposed subjacent said slots, a lever for each of said slots, means pivotally connecting said levers on said ring, means for actuating each of said levers to effect pivotal movement of one end thereof through said slots for selective engagement with said ratchet means, and resilient means connected with each of said levers constantly biasing said levers for pivotal movement out of engagement with said one of said ratchet means.

References Cited in the file of this patent

UNITED STATES PATENTS

| | | |
|---|---|---|
| 1,811,152 | Seversky | June 23, 1931 |
| 2,229,352 | Thannhauser | Jan. 21, 1941 |

FOREIGN PATENTS

| | | |
|---|---|---|
| 122,352 | Sweden | July 27, 1948 |